United States Patent
Ehrmann et al.

(10) Patent No.: US 10,843,834 B2
(45) Date of Patent: Nov. 24, 2020

(54) PACKAGING MACHINE HAVING MOISTURE SENSOR

(71) Applicant: MULTIVAC SEPP HAGGENMÜLLER SE & CO. KG, Wolfertschwenden (DE)

(72) Inventors: Elmar Ehrmann, Bad Grönenbach (DE); Claus Botzenhardt, Kempten (DE); Thomas Holderied, Dietmannsried (DE); Florian Felch, Durach (DE); Tobias Enderle, Bad Grönenbach (DE)

(73) Assignee: Multivac Sepp Haggenmüller SE & Co. KG, Wolfertschwenden (DE)

( * ) Notice: Subject to any disclaimer, the term of this patent is extended or adjusted under 35 U.S.C. 154(b) by 126 days.

(21) Appl. No.: 15/750,174

(22) PCT Filed: Aug. 8, 2016

(86) PCT No.: PCT/EP2016/068898
§ 371 (c)(1),
(2) Date: Feb. 2, 2018

(87) PCT Pub. No.: WO2017/021557
PCT Pub. Date: Feb. 9, 2017

(65) Prior Publication Data
US 2018/0222619 A1 Aug. 9, 2018

(30) Foreign Application Priority Data

Aug. 6, 2015 (DE) .................. 10 2015 214 992

(51) Int. Cl.
*B65B 57/00* (2006.01)
*B29C 51/46* (2006.01)
(Continued)

(52) U.S. Cl.
CPC ............. *B65B 57/00* (2013.01); *B29C 51/46* (2013.01); *B29C 65/18* (2013.01);
(Continued)

(58) Field of Classification Search
CPC ......... B65B 57/00; B65B 57/04; B65B 57/06; B65B 57/08; B65B 57/10; B65B 57/12; B65B 57/14; B65B 57/145; B65B 57/16
(Continued)

(56) References Cited

U.S. PATENT DOCUMENTS 4,691,496 A 9/1987 Anderson et al.
6,056,109 A 5/2000 Hidai et al.
(Continued)

FOREIGN PATENT DOCUMENTS

CN 201566855 U 9/2010
CN 102372100 A 3/2012
(Continued)

OTHER PUBLICATIONS

Moser, A., 2013 "Use of process knowledge in the thermoforming of packaging", PhD thesis, University of Duisburg-Essen, Duisburg, pp. 1-135.

*Primary Examiner* — Chelsea E Stinson
(74) *Attorney, Agent, or Firm* — Husch Blackwell LLP

(57) ABSTRACT

A packaging machine, comprising a control unit, at least one measurement device and a plurality of work units for different processes. One of the work units is designed as a sealing station which comprises at least one moisture sensor designed as the measurement device which is functionally connected to the control unit and is designed to detect moisture within the sealing station as a time-dependent measured variable during a program sequence of the sealing station. The program sequence may comprise an evacuation process, wherein the control unit is designed to calculate a
(Continued)

rate of change in the moisture during the evacuation process of the sealing station. The control unit may abort the evacuation process performed on the sealing station, based on the rate of change, before reaching a target vacuum pressure within the sealing station, immediately or after a specified delay time elapses.

21 Claims, 12 Drawing Sheets

(51) Int. Cl.
*B65B 47/02* (2006.01)
*B65B 9/04* (2006.01)
*B29C 65/18* (2006.01)
*B29C 65/00* (2006.01)
*B65B 31/02* (2006.01)
*B65B 51/10* (2006.01)
*G05B 19/042* (2006.01)
*B65B 51/14* (2006.01)
*B29L 31/00* (2006.01)

(52) U.S. Cl.
CPC ...... *B29C 66/00145* (2013.01); *B29C 66/112* (2013.01); *B29C 66/131* (2013.01); *B29C 66/53461* (2013.01); *B29C 66/81455* (2013.01); *B29C 66/82421* (2013.01); *B29C 66/83221* (2013.01); *B29C 66/849* (2013.01); *B29C 66/9121* (2013.01); *B29C 66/9141* (2013.01); *B29C 66/924* (2013.01); *B29C 66/9221* (2013.01); *B29C 66/9231* (2013.01); *B29C 66/92443* (2013.01); *B29C 66/92921* (2013.01); *B29C 66/944* (2013.01); *B29C 66/953* (2013.01); *B65B 9/04* (2013.01); *B65B 31/022* (2013.01); *B65B 47/02* (2013.01); *B65B 51/10* (2013.01); *G05B 19/0426* (2013.01); *B29L 2031/712* (2013.01); *B65B 51/14* (2013.01); *B65B 2051/105* (2013.01); *G05B 2219/23012* (2013.01); *G05B 2219/45048* (2013.01)

(58) Field of Classification Search
USPC .......................................................... 53/405
See application file for complete search history.

(56) References Cited

U.S. PATENT DOCUMENTS

| | | | |
|---|---|---|---|
| 2002/0051833 | A1 | 5/2002 | Shiozaki |
| 2005/0039420 | A1 | 2/2005 | Albritton et al. |
| 2008/0152767 | A1* | 6/2008 | Maisel .................. B65B 9/04 426/118 |
| 2010/0024360 | A1* | 2/2010 | Ehrmann ................ B29C 65/08 53/285 |
| 2013/0152507 | A1 | 6/2013 | Frazier et al. |
| 2014/0109511 | A1* | 4/2014 | Hammad ............ B29C 66/8324 53/79 |
| 2016/0047786 | A1* | 2/2016 | Owens .................. A23L 3/0155 426/418 |
| 2016/0280406 | A1* | 9/2016 | Chierchia ............... B65B 31/00 |

FOREIGN PATENT DOCUMENTS

| | | |
|---|---|---|
| CN | 103930349 A | 7/2014 |
| CN | 203845103 U | 9/2014 |
| CN | 104554910 A | 4/2015 |
| DE | 7345840 U | 11/1977 |
| DE | 3739432 A1 | 6/1989 |
| DE | 19735942 A1 | 3/1999 |
| DE | 69517697 T2 | 10/2000 |
| DE | 102005059312 A1 | 6/2007 |
| DE | 102006040807 A1 | 3/2008 |
| DE | 102006050417 A1 | 4/2008 |
| DE | 102008024461 A1 | 12/2009 |
| DE | 102009017638 A1 | 10/2010 |
| DE | 102009040977 A1 | 3/2011 |
| DE | 202010017361 U1 | 12/2011 |
| DE | 102012004341 A1 | 9/2013 |
| DE | 102012005179 A1 | 9/2013 |
| DE | 102012005912 A1 | 9/2013 |
| DE | 102013105548 A1 | 12/2014 |
| DE | 102007062335 B4 | 9/2019 |
| EP | 1225491 A1 | 7/2002 |
| EP | 1316002 A1 | 6/2003 |
| EP | 1710074 A1 | 10/2006 |
| EP | 1818159 A2 | 8/2007 |
| EP | 1935787 A1 | 6/2008 |
| EP | 2241862 A2 | 10/2010 |
| EP | 2252921 A1 | 11/2010 |
| EP | 2415677 A1 | 2/2012 |
| EP | 2690023 A1 | 1/2014 |
| EP | 2722279 A1 | 4/2014 |
| JP | 04138504 A | 5/1992 |
| WO | 0019278 A1 | 4/2000 |
| WO | 2009109178 A1 | 9/2009 |

* cited by examiner

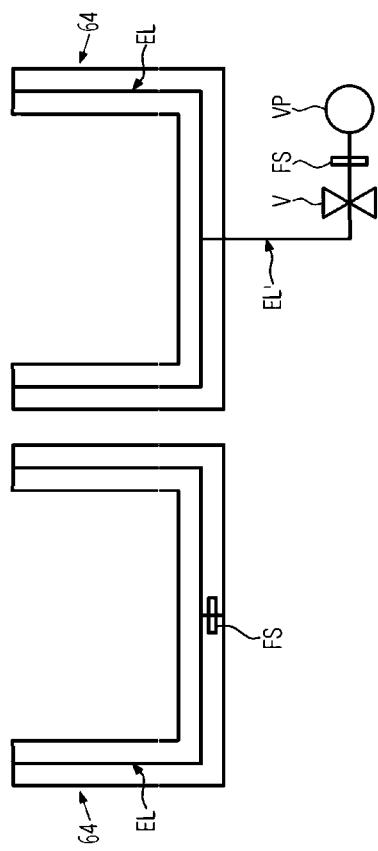

PACKAGING MACHINE HAVING MOISTURE SENSOR

FIELD OF THE INVENTION

The present invention relates to a self-controlling packaging machine and a method of using a self-controlling packaging machine.

BACKGROUND OF THE INVENTION

In known packaging machines, the production process consists of a plurality of individual processes, for example, closing chamber, heating, molding, evacuating, gassing, sealing, opening chamber, and safety times in order to sufficiently ventilate or aerate chambers.

Thereby, the individual processes are time-controlled, wherein the individual processes run successively, where appropriate, temporarily overlapping or separately by safety time intervals. The respective process times in particular depend on a chamber volume, film types, motion sequences, and switching times of valves of the packaging machine and therefore, have to be preset in a complex manner by the machine operators for each machine equipment as well as for each product to be manufactured at the operating console of the packaging machine.

Adjusting the respective process times of the packaging machine as well as coordinating the respective process times with one another requires an extensive knowledge about the individual processes of the machine operator, whereby even in case of very experienced machine operators, it occurs that several test runs are necessary for the packaging machine in order to get the respective process times smoothly coordinated with one another.

However, during adjusting the process times of the packaging machine, time delays often occur due to which the performance of the packaging machine is considerably reduced.

In FIG. 7a, a known forming station is shown. Said molding station comprises an upper part as well as a lower part which is adjustable in height by means of a lifting unit. Between the upper part and the lower part, a heating plate is provided in a molding chamber which serves to heat a film section to be deformed. Further, pressure and ventilation valves are provided in the upper part and in the lower part in order to on the one hand initially press the film section against the heating plate and on the other hand to allow pressure forming of a packaging trough M. These processes are time-controlled according to a preset schedule.

The time-controlled valve switch is illustrated in FIG. 7b. In section AA, the main processes open/close of lifting unit, heating and molding are shown. Below, in section BB, the preset process times are shown which are adjusted by the operator in the packaging machine. In section CC, the ventilation and pressure valve positions for the upper part and the lower part of the forming station are shown. In section DD, the respective pressure distributions in the upper part and the lower part are displayed.

After the forming station had been closed (step A'), pressure is generated in the lower part (step B'). The pressure build-up is time-controlled (step C') and is interrupted or terminated as soon as the preset time has elapsed. Equally, a preset heating time of the heating plate (step D') is elapsing. After the heating time has elapsed, the ventilation valve in the lower part opens (step E') and pressure is build up in the upper part in order to form the heated film section (step F'). The pressure build-up as well as a stabilization time preset for forming elapse in a time-controlled manner (steps G' and H'). As soon as the stabilization time has elapsed, the upper ventilation opens (step I'). Now, a preset safety time at the end of the forming process (step J') is elapsing before the forming station opens (step K').

The processes open/close of lifting unit are position-controlled and heating and forming are time-controlled in case of the upper forming station. Therefore, the operator has to enter a time control schedule for the forming station in the control unit. When developing the time control schedule, the operator cautiously approaches a desired packaging result in several tests. This cautious approaching requires a high degree of experience and may only be carried out by skilled personnel.

Document DE 10 2009 017 638 A1 discloses a packaging machine to which process times are adjustable by changing boundary conditions. Thereby, the respective process times are in particular based on the number of the provided products to be packaged.

Document EP 1 316 002 B1 discloses a machine tool the operation of which is controllable by means of additional data from a database Document DE 10 2012 005 912 A1 discloses a method for verifying the availability of the components used in a packaging line.

Document DE 10 2006 040 807 A1 discloses a sealing station or a packaging machine wherein a force sensor is provided in the force flow of the sealing station which enables quality monitoring during the sealing process.

Document DE 10 2005 059 312 A1 discloses a packaging machine comprising a reading unit for reading out machine-relevant information of a replacement part used in the packaging machine.

Document EP 1 710 074 A1 discloses a packaging machine with a tool comprising a sensor chip. Characteristic values of the tool read out from the sensor chip may be used for adjusting the packaging machine.

Document DE 20 2010 017 361 U1 discloses a method by means of which the production process of a meat product can be retraced.

Document WO 00/19278 A1 does not relate to the packaging technology but discloses a print or copy system in which the consumption of ink cartridges is monitored.

Document DE 10 2008 024 461 A1 discloses a packaging machine comprising a processing station control unit which is connected to a central control unit.

Document EP 2 985 233 A1 discloses an appliance for producing a vacuum packaging, wherein the appliance is provided with a moisture sensor which detects an absolute moisture value in the interior of the packaging during an evacuation operation. A detected liquid in the packaging enhances the signal of the sensor. In the event the signal is equal to or greater than a threshold value, this means that liquid is present in the packaging. A microprocessor then can switch off a vacuum motor. Thereby, it is a problem that detecting the absolute moisture value does not constitute a suitable measured variable for all products to justify an abort of the evacuation operation. Rather, there are also products in which the signal detected at the moisture sensor varies, since the effective moisture value fluctuates so that an abort of the evacuating operation is not always justified. This phenomenon in particular occurs with products the content of which is uneven or inhomogeneous, for example meat loaf or cheese with holes as e.g. Tilsit cheese. In addition, the absolute moisture value does not constitute a suitable measured variable in order to determine a tendency of the pressure distribution within the packaging based on which it could be determined whether the desired vacuum pressure in the package interior may be generated or not in spite of the presence of moisture.

SUMMARY OF THE INVENTION

It is an object of the invention to provide a packaging machine which solves the problems explained above in connection with the prior art by means of simple constructional features. It is also an object to provide a suitable method for this. This problem is solved by the packaging machine according to claim 1 or by a method according to independent claim 16. Improved embodiments of the invention are subject matter of the dependent claims.

The invention relates to a packaging machine, which comprises a control unit, at least one measurement device and multiple work units for different processes, wherein the control unit is functionally connected to the work units as well as to the measurement device, wherein the measurement device is configured to detect actual process values at the respective work unit and forward same to the control unit in order to monitor a process status of the work unit. Furthermore, in the invention, the control unit is designed to produce a program sequence in a self-controlled manner for each work unit itself and/or in a coordinated manner with respect to the work units by comparing the actual process values forwarded to the control unit from the measurement device with corresponding target process values from a storage unit connected to the control unit, and each work unit functions itself and/or in a coordinated manner according to said program sequence.

In the invention, one of the work units is designed as a sealing station which comprises at least one moisture sensor designed as the measurement device which is functionally connected to the control unit and is designed to detect moisture within the sealing station as a time-dependent measured variable during a program sequence, wherein the program sequence comprises an evacuation process.

According to the invention, the control unit is designed to calculate a rate of change in the moisture during the evacuation process of the sealing station (i.e. change in moisture per time unit). Thereby, An increase of moisture can be detected.

According to the invention, the control unit is designed to abort the evacuation process performed on the sealing station before reaching a target vacuum pressure within the sealing station, immediately or after a specified delay time elapses, if the rate of change in the moisture is equal to or greater than a predetermined threshold value or if a difference of the rate of change minus the threshold value has changed from a negative value to a positive value and back again from a positive value to a negative value. The rate of change in moisture generally is a measure of how quickly the moisture changes during a work cycle. Thereby, independent of the product to be manufactured, i.e. independent of its packaging content, a reference value suitable for the abort of the evacuation process can be provided. In addition, the rate of change in moisture forms a suitable factor for predicting a tendency of the pressure distribution on the basis of which it can be determined whether or not the evacuation process can still achieve the desired vacuum pressure. In the invention, the rate of change in particular forms an appropriate indicator for the fact from which point in time during the evacuation process an evaporation of the product to be packaged occurs, i.e. from which point in time the moisture content of the product decreases due to the evacuation process.

Preferably, the control unit is designed to abort the evacuation process if the rate of change in moisture is positive and/or equal to or greater than a predetermined positive threshold value of the rate of change. The positive rate of change, particularly in case of food packaging process is deemed a reliable indicator for the fact that the packaging content of the product to be manufactured has certain moisture content, wherein during evacuating the product a loss of moisture of the packaged content may occur, in practice also referred to as "evaporation". This is not always undesirable because some products may suffer product quality. Furthermore, the positive rate of change is an indicator for the fact that water vapor is generated by the evaporation, whereby the moisture content within the packaging increases. However, this may result in that the desired vacuum pressure is not reached within a predetermined time, since a vacuum pump used for this in the evacuation process is negatively affected, i.e. the performance of which may possibly be reduced with the present moisture detection.

An advantageous variant provides for the control unit to be designed to filter out negative rates of change during the beginning of the evacuation process by means of a filter function which is formed on said control unit. This is advantageous, since the measured moisture content behaves similarly during the beginning of the evacuation process in case of dry and moist products. Thereby, initially moisture can be removed from the packaging before evaporation of a moist packaging occurs. The latter is undesirable and may not be indicated by a positive rate of change.

Preferably, the control unit is designed to store an abort of the evacuation process as a poor clock, if a non-target product vacuum is impermissible. According to an embodiment, the control unit is designed to store an abort of the evacuation process as good clock, if a non-target product vacuum is permissible.

It is possible that the moisture sensor is arranged within a sealing chamber of a sealing station. For an improved protection of the moisture sensor, an improved variant provides that the sealing station comprises a sealing tool lower part as well as an evacuation line integrally formed thereon, wherein the moisture sensor is arranged in the evacuation line. Preferably, the moisture sensor is arranged in the evacuation line in a section in which several sections join the evacuation line. Therefore, in the joint section, the moisture may be detected independently of the moisture values of the individual sections of the evacuation line.

According to an embodiment, the sealing station comprises a sealing tool lower part as well as an evacuation line connected to the sealing tool lower part, wherein the moisture sensor is arranged in the evacuation line. This variant offers advantages with regard to the production of the sealing tool lower part. Preferably, the evacuation line connects the sealing tool lower part with a vacuum pump and comprises a valve, wherein the moisture sensor is arranged between the vacuum pump and the valve.

Preferably, the packaging machine comprises a further storage unit, for example a circular buffer, wherein the control unit is designed to store intermittently, in particular in an intermittent with the duration of 1 to 50 milliseconds, time-dependent measured values detected at the sealing station on the further storage unit. In particular, the control unit can be designed to store measured values measured in volts for the moisture within the sealing station in an intermittent with a duration of 1 to 50 milliseconds, in particular in an intermittent with a duration of 4 to 10 milliseconds, in the further storage unit.

According to an embodiment, the control unit is designed to calculate a regression line the gradient of which corresponds to the rate of change of the moisture by means of a plurality of absolute measured values of the moisture or corresponding voltage signals. The calculation of the regression line serves to a certain extent as a filter function. For example, 10 to 50 measured values could be used for calculating the regression line from the control unit. Preferably, the control unit may be configured to disregard measured values which are extremely outside the trend, for example a decreasing rate of change, irrespective of whether they are positive or negative, by means of a filter function associated to the control unit when calculating the rate of change.

Preferably, the control unit is designed to consider a measurement period of 4 to 500 milliseconds, preferably a measurement period of 30 to 100 milliseconds, as filter function and condition for the abort of the evacuation process within which the rate of change of the moisture is exclusively positive.

Preferably, the control unit is designed to issue an error message, for example via an HMI interface of the packaging machine, if no positive rate of change of the moisture can be detected by the control unit during the evacuation process and the target vacuum pressure cannot be reached within the sealing station. Although the desirable vacuum pressure is not reached, which per se suggests an evaporated moist product, the moisture graph which is not rising during the evacuation process thereby indicates that the sealing station is leaking.

Preferably, the packaging machine is a deep-drawing packaging machine (15), a tray sealer or a chamber conveyor belt machine.

Preferably, the work unit comprises a movable lower part and an upper part sandwiching a molding chamber and/or a sealing chamber and each having at least one pressure measurement device. The evacuation process previously described in connection with other embodiments, can be in particular carried out within the sealing chamber.

According to a variant, the program sequence comprises a gassing process wherein the control unit is designed to start the gassing process when the evacuation process is completed. In case of the process-controlled packaging machine, the gassing process may in particular be started by the abort of the evacuation process by means of the control unit. Thereby, it is possible that a certain residual moisture can be displaced by the gassing process form the packaging interior.

Preferably, the program sequence comprises a sealing process at the work unit, wherein the control unit is designed to start the sealing process when the evacuation process and/or the gassing process are completed.

The invention also relates to a method for self-controlling a program sequence of a process at different work units of a packaging machine, wherein according to the program sequence, a process and/or according to the program sequence several processes which are functionally coordinated to one another are supposed to be carried out during the operation of the packaging machine at the respective work units, wherein at least at one of the respective work units actual process values are detected and forwarded to a control unit of the packaging machine, wherein the control unit compares the forwarded actual process values forwarded with associated target process values and resulting therefrom, generates the respective program sequence for the work units themselves and/or coordinated with respect to the respective work units and based thereon coordinates the operation of the packaging machine, wherein at a work unit of the packaging machine being configured as sealing station, at least one moisture sensor which is configured as measurement device detects a moisture within the sealing station as time-dependent measured value, wherein the control unit at least in sections calculates a rate of change in moisture at the sealing station during the program sequence, and wherein the control unit immediately or after the expiration of a predetermined delay time aborts an evacuation process carried out at the sealing station before achieving a target vacuum pressure within the sealing station, if the rate of change in moisture is equal to or greater than a predetermined threshold value or if a difference of the rate of change minus the threshold value changes from a negative value to a positive value and back again from a positive value to a negative value.

Preferably, the control unit aborts the evacuation process, if the rate of change in moisture is positive and/or equal to or greater than a predetermined positive threshold value for the rate of change. This, namely, may be an indicator for the fact that the product to be packaged evaporates, i.e. its moisture content decreases.

One possibility for calculating the rate of change would be that the control unit by means of several absolute measured values of the moisture calculates a regression line, the gradient of which determines the rate of change in moisture.

Preferably, the control unit can consider, as a filter function and condition for the abort of the evacuation process, a measurement period of 4 to 500 milliseconds, within which the rate of change in moisture is exclusively positive. It is also conceivable that the control unit is designed to let run the measurement period from the point in time, when for the first time during the evacuation process, the rate of change is equal to zero, i.e. if the rate of change changes its sign.

Preferably, the control unit can issue an error message if no positive rate of change of the moisture can be determined during the evacuation process and the target vacuum pressure is not reached within the sealing station. Thereby, a leaky tool can be detected.

According to a variant, the control unit starts a gassing process at the sealing station when the evacuation process is completed, in particular is aborted. The gassing process can displace a residual moisture which remained in the packaging so that the product to be packaged can be packaged in a desirable atmosphere.

In one or more embodiments of the invention, in contrast to known time-controlled packaging machines, the packaging machine as well as the method therefor are process-controlled by means of intelligent sensor technology and control technology. The respective work processes are monitored, in particular by means of sensors and are controlled depending on values detected thereby. In a preferred packaging machine, the program sequence of the work units used for it is no longer primarily bound to process times predetermined by the operator but is adapted to the actual production process during the operation, in particular to the measurable process progress of the respective work units. Thereby, it is in particular monitored how far the actual process values have progressed at the respective work units in view of the predetermined or calculable target process values. Fixed running process times as so far had been manually preset on the machine by the operator, are primarily no longer considered, since the respective processes at the work units are running until one or more target process values are reached, i.e., the respective processes are sensor-controlled.

If at all, process times are used in the invention which are automatically retrievable from a storage unit and which can be generated by means of specific production parameters relating to the product, the tool and/or the packaging material. Thus, the packaging machine can be quickly adapted in case of a tool change and/or a product change without the operator needing a long time for newly adjusting the packaging machine. In case of the invention, thus, the packaging machine optimally adapts its operation itself.

For this purpose, the packaging machine preferably comprises a control unit, multiple measurement devices as well as multiple work units for different processes, wherein the control unit is functionally connected to the work units as well as to the measurement devices. The measurement devices are configured to detect actual process values at each work unit and forward same to the control unit in order to monitor a process status. The control unit is preferably designed to produce a program sequence in a self-controlled manner and/or in a coordinated manner for each work unit by comparing the actual process values forwarded to the control unit from each measurement device with corresponding target process values, in particular a corresponding target process value region from a storage unit connected to the control unit. The respective work units then function on the basis of the thereby detected actual process values themselves and/or in this regard in a coordinated manner to one another.

Self-controlled in terms of the invention means that the program sequence at least at one of the work units does not run according to the predetermined process time. The program sequence at a work unit rather adapts referring to the actual process values detected thereon, thus, is sensor-controlled. In the invention, the control unit functions as a functional link between the measurement devices and the work units. Preferably, the detected actual process values are forwarded by the measurement devices to the control unit which with respect to the actual process values controls each program sequence for the work units themselves and/or adapted to one another.

In particular, a process may start at a work unit when a functionally preceding work unit achieves at least one target process value. Thus, in particular, the sequence of the individual work units can be well coordinated to one another. In the invention, a functional connection between the individual work units can be established so that the respective work units can work smoothly one after the other.

In addition, an embodiment of the invention allows an early start detection of individual work units by means of the actual process value determination at the respective work units. This is based on the fact that for controlling the valves and/or for generating control signals, a certain reaction time is required which in expert circles is also referred to as dead time. In order to reduce such dead times, in the invention, based on the actual process value determination, at least the sequence of a work unit can be started prematurely, i.e. some time before a target process value is reached. This in total results in time savings, since the respective working processes are better coordinated with one another in the sequence.

Preferably, the packaging machine basically differs from the prior art in that it is no longer time-controlled according to a predetermined fixed program sequence, i.e. operated with specific process times for each work unit. The packaging machine according to the invention by means of its available sensor technology and control is rather capable to adapt the respective processes of the work units to the actual process values currently detected thereon, namely preferably irrespective of how long the respective process had already been carried out. The respective processes may thereby be carried out economically optimal and, if appropriate, may run coordinated to one another such that overall greater batch sizes can be produced within smaller cycle times. In addition, therefore, the same quality can be achieved for all products.

In contrast to the prior at, regarding the variants of the invention, the performance of the packaging machine does no longer depend on the adjustment capabilities of the machine operator but on the technical skills of the packaging machine itself, to adapt to the production process, i.e. to the process values currently detected at the work units, in a self-controlled manner.

The packaging machine according to the invention has turned out to be in particular preferred for the starting phase of a production process, since thereby, several test runs for optimally adjusting the packaging machine are no longer necessary. The packaging machine according to the invention rather allows a production of products to be manufactured being optimal from the outset, since the respective processes at the work units are controllable immediately with respect to the actual process values currently detected thereon by means of the control unit via feedback in the sequence.

Due to the fact that in the invention, the packaging machine itself is designed for optimizing the processes carried out thereon, an increased clock performance occurs, whereby the personnel costs can be reduced.

Preferably, the packaging machine comprises at least one robot configured as a work unit. This is in particular used as a pick and placer of packaging to be filled. In this invention, the operation of the robot can be adapted with regard to the sequence of other work units. In particular, accelerations carried out by the robot arm can be adapted with regard to the progress of other work units on the packaging machine.

According to an embodiment of the invention, the packaging machine can be designed as a deep-drawing packaging machine, a tray sealer or a chamber conveyor belt machine. Since in such packaging machines several working processes are running, in particular in coordination with one another, the self-controlling feedback can be used in a particularly performance-enhanced manner by means of the control unit of the packaging machine according to the invention. These packaging machines then can control their production process in a self-controlled and automatic manner without having to refer to predetermined process working time cycles. In this respect, conversion times can also be considerably reduced on such machines.

Preferably, the storage unit connected to the control unit serves as a data reservoir from which the control unit obtains the target process values in order to carry out a feedback control as soon as possible for the respective work units in order to detect the actual process values.

It is in particular possible that the storage unit is designed as a database, preferably as a knowledge database which is configured to derive the target process values for the respective work units with regard to data of a product to be produced by means of the packaging machine. Preferably, the product to be produced, in particular a film specification, a tool type and/or a food product to be packaged, can be retrieved via an input console of the packaging machine, wherein based on this setting, a specific data set of target process values can be made available by the storage unit, in particular by the database contained therein. This would have the advantage that the machine operator when starting the production, only has to select the product to be produced on the input console of the packaging machine, wherein as a result, the production process is taken over in a self-controlled manner by the packaging machine.

The database can be used in a particularly versatile manner, if it is configured as a component of a database system, wherein the database system further comprises a database management unit which is configured for a bidirectional data exchange between the control unit and the database. By means of the database management unit, not only the relevant target process values can be determined and/or read out in this respect based on the detected actual process values at the work units, but in addition, also control functions can be carried out, in particular based on the control unit at the database so that, for example, data sets stored on the database may be corrected, adapted and/or replaced. The packaging machine according to the invention then could be easily adapted to a new product which has not previously been produced therewith. Updates of the data sets stored on the database could be played on the database, for example, via a VPN connection, a wireless connection, for example using RFID or from a USB stick.

Preferably, the processes on the packaging machine are in particular controlled by format-dependent, process-dependent, and/or film-dependent information. Film-dependent information relates in particular to a drawing depth, a seal seam width, a final vacuum during sealing, a number of packages, a package size and/or a molding depth. Process-dependent information is in particular a specific molding pressure, a specific sealing pressure, a cutting time, maximally permissible early start times when opening or closing a lifting unit and/or maximally permissible early start times during film feed. In particular, film-dependent information is a film type, a sealing layer, a film thickness, a sealing layer thickness, a cooling time (stabilization time) in the mold, an ideal heating time, an ideal sealing time, an ideal heating time during molding and preheating and/or an ideal heating temperature during sealing. In particular, the control unit is configured to produce the target process values and/or the control signals for the production process based on the format-, process- and/or film-dependent information. Preferably, the target process values are based on data from the product to be produced which in particular indicate a sealing surface, a sealing pressure, a final vacuum, a film type and/or a film thickness or a film specification, such as for example the layer construction.

Preferably, information relating to the film specification may be stored in the database by means of a wireless connection, in particular, the information about the film material can be read out by an RFID tag attached to the film by means of an RFID reader provided on the packaging machine and stored by the latter in the database.

For each product to be produced, there is preferably a preselection of certain target process values which are available to the process-controlled self-control functionality of the packaging machine during operation. The program sequences at the respective work units, thus, can be adapted with respect to the predetermined target process values.

Preferably, the target process values indicate an optimal molding and/or sealing temperature, an optimal sealing and/or molding pressure, and/or at least one stabilization time for a work unit configured as molding station. When the predetermined optimal target process value/s is or are reached, the control unit may decide when the process at a work unit can be terminated and a subsequent process can be started at the same work unit or at a different work unit in order to control the production sequence with smooth transitions between the processes of the respective work units.

According to an alternative embodiment, the storage unit is configured integrally in the control unit or alternatively is available as external unit. In case of the integral configuration of the storage unit in the control unit, the storage unit may be controlled directly via an operating console of the packaging machine, wherein in this variant, primarily data sets stored in the storage unit may be updated, replaced and/or supplemented by means of the operating console. In particular, as an external unit, the storage unit can be functionally connected to multiple packaging machines, wherein the respective control units of the multiple packaging machines may have functional access to the storage unit being configured as external unit. This is particularly expedient, if multiple packaging machines work parallel to one another in a production building, wherein it is not implicitly necessary that the respective packaging machines each are equipped with their own storage unit. It would also be conceivable that the multiple packaging machines refer to different data sets of the storage unit. Thereby, it would be conceivable that different production processes run at the packaging machines.

Preferably, the storage unit is functionally connectable with an external network, wherein the storage unit can be updated or controlled via the external network. It would be conceivable that e.g. a machine operator plays data sets into the storage unit from his computer workstation via the external network in which his computer is functionally integrated. It would also be conceivable that the external network is used by the packaging machine producer to control the storage unit of the packaging machine, although this is already involved in the production at the food packaging company. On the basis of this variant, arbitrary data may be read out form the storage unit, for example, error messages, operation states, product data and/or server data.

Preferably, the respective measurement devices comprise at least one force, pressure, position, temperature, infrared, ultrasonic, induction, laser, and/or a further moisture sensor. The respective sensors are in particular integral elements of the work units in order to detect as precisely as possible the actual process values present thereon. Preferably, the used sensors detect the respective process values continuously during the operation of the packaging machine so that when a target process value is reached, the control unit can react quickly to terminate the process if appropriate and start a subsequent process.

Preferably, at least one of the work units comprises a movable lower part and an upper part sandwiching a molding chamber or a sealing chamber and each comprising at least one pressure measurement device. Thereby, the pressure distributions may be monitored within the upper part and the lower part during the production process. The control unit thereby can carry out a control of the pressure generation depending on the pressure distributions. The control unit could as well control other processes within the molding chamber or the sealing chamber depending on the pressure distributions.

According to an embodiment, one of the work units of the packaging machine is designed as molding station at least comprising one heating plate. This serves to heat a film section which is inserted into the molding station so that said film section subsequently may be well-molded. It is preferred if a function of the heating plate is controllable based on pressure values within the molding station, in particular, if a heating time of the heating plate is accessible depending on an achieved pressure level within the molding station.

According to a variant, the molding station comprises a heating chamber and a molding chamber which are configured spatially separate from one another. The heating chamber thereby serves as preheating and comprises preferably a lower and an upper heating plate between which a film section can be clamped. In order to generate an especially high clamping force, a pressure generator may be arranged above the upper heating plate, in particular an inflatable membrane which can press the upper heating plate downwards.

It is conceivable that one of the work units is designed as sealing station. This may optionally be equipped with a gassing unit in order to create a desirable atmosphere for the product to be sealed.

Preferably, the actual process value is a pressure detected in the work unit, wherein the control unit is configured to terminate or start at least one working process at said or at least at one of the other work unit/s if the detected pressure has reached a predetermined pressure level. The working process can, for example, be a heating or cooling process which takes place according to a heating or cooling time being present from the storage unit.

The invention also relates to a method for self-controlling a program sequence of a process at different work units of a packaging machine. According to the program sequence, a process and/or multiple processes which are functionally coordinated to one another is/are carried out at the respective work units during the operation of the packaging machine, wherein at the respective work units, actual process values are detected and forwarded to a control unit of the packaging machine, wherein the control unit compares the forwarded actual process values with corresponding target process values and resulting therefrom, produces the respective program sequence for work units themselves and/or coordinates the respective work units to one another in a self-controlling manner and based thereon, coordinates the operation of the packaging machine.

The operation of the packaging machine therefore depends on the detected actual process values at the respective work units. Taking into account the target process values for the product to be produced, based on the detected actual process values, it then can be determined by means of the control unit whether the respective process at a work unit can be continued or aborted and, if appropriate, a subsequent process may start. The self-control of the packaging machine, thus, on the one hand depends on the sensor technology integrally provided at the respective work units and, on the other hand, on the feedback controlling function by considering target process values, wherein the target process values of the control unit are in particular provided by a storage unit connected to the control unit.

By means of the method according to the invention, the respective program sequences of the processes carried out at the work units are adapted during the operation in view of the actual process values measured thereon. The sequence of the processes is no longer fixedly time-controlled, but is self-controlling as a function of measured and reached actual process values.

Starting a process at a work unit therefore, in the invention primarily depends on which actual process values are measured in the process upstream the production process and/or at least in a process at one work unit which at least partially runs simultaneously. Preferably, the process starts at a work unit when in a process upstream the production process of said or at least another work unit the detected process value/s correspond/s to the predetermined target process values. Of course, it may also be the case that the process of a work unit is already started when one or more specific actual process value/s in said process upstream this work unit has/have not yet reached the target process values. This can in particular result in avoiding dead times, due to which the clock cycle times may be shortened. In case of temporally spaced apart processes which take place successively, it would be possible that when the target process value in a process of a work unit of the subsequent process is only started when a predetermined time interval is between them.

The respective processes at the work units can therefore be optimized by means of sensor technology and feedback control even in their sequence, wherein the respective optimized program sequences of the processes also serve the other processes of the method for optimizing so that the entire program sequence of the method of the packaging machine can be optimized depending on the respective processes to one another.

Other aspects and advantages of the present invention will be apparent from the following detailed description of the preferred embodiments and the accompanying drawing figures.

DESCRIPTION OF THE SEVERAL VIEWS OF THE DRAWING

In the following, an advantageous embodiment of the present invention will be explained in more detail making reference to a drawing, in which the individual figures show:

FIG. 4b is a schematic process diagram for the molding station of FIG. 4a;

FIG. 5b is a schematic process diagram for the molding station of FIG. 5a;

FIG. 6b is a schematic process diagram for the sealing station of FIG. 6a;

FIG. 9a is a schematic section view of one embodiment of a sealing tool lower part with a moisture sensor in accordance with the teachings of the present disclosure; and FIG. 9b is a schematic view of another embodiment of a sealing tool lower part with moisture sensor in accordance with the teachings of the present disclosure.

DETAILED DESCRIPTION OF THE INVENTION

Figure 1:
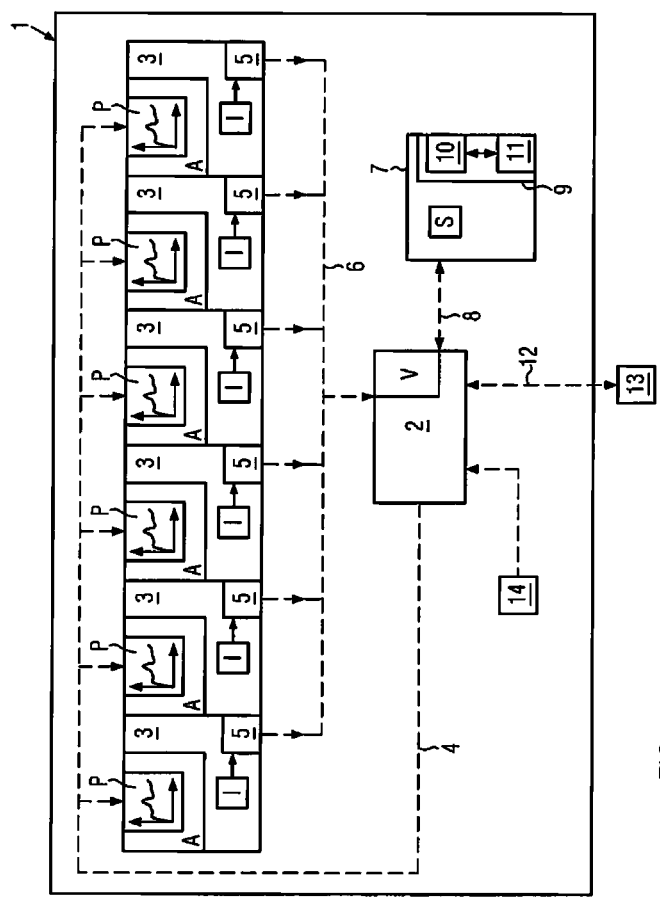
FIG. 1 is a schematic view of a process-controlled packaging machine in accordance with the teachings of the present disclosure.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows in a schematic view a packaging machine 1 according to the invention. For controlling the production process, the packaging machine 1 comprises a control unit 2. Furthermore, the packaging machine 1 has a plurality of work units 3 each of which is connected to the control unit 2 by means of a functional connection 4. The work units 3 are work stations which are configured for different processes in order to thereby produce the desired product. During the production process, the respective work units 3 run coordinated to one another. Thereby, the respective work units 3 may work successively seen from a temporal perspective and/or to some extent parallel to one another, i.e. in an overlapping manner.

The packaging machine 1 according to FIG. 1 contains a plurality of measurement devices 5 which are each integrated in the work units 3. The measurement devices 5 are configured to detect actual process values I at the respective work units 3. Further, FIG. 1 shows that the respective measurement devices 5 are connected to a control unit 2 via a further functional connection 6. Via the further functional connection 6, the measurement devices 5 can forward the detected actual values I to the control unit 2. Thereby, the respective actual process states of the work units 3 can be monitored during the production process by means of the installed measurement devices 5.

FIG. 1 also shows that the control unit 2 is connected to a storage unit 7. According to FIG. 1, the storage unit 7 is designed as part of the packaging machine 2, wherein it could also be connected as an external unit to the control unit 2 of the packaging machine 1. The storage unit 7 which also comprises a database is configured to provide target process values S. The target process values S in particular depend on specific data of the product to be produced. For example, the target process values S could result with regard to a film thickness, a film type, a sealing surface, a sealing pressure, a final vacuum to be evacuated, and/or a product to be packaged. For each product to be produced which essentially consists of the product to be packaged as well as the packaging for it, thus, different target process values S may be provided from the storage unit 7.

According to FIG. 1, the control unit 2 has access to the target process values S from the storage unit 7 via a data connection 8. In particular, the data connection 8 is configured for a bidirectional data traffic between the control unit 2 and the storage unit 7.

Furthermore, FIG. 1 shows that the control unit 2 is designed to produce a program sequence P by comparing V the actual process values I forwarded to it from the respective measurement devices 5 with the associated target process values S from the storage unit 7 connected to it. The program sequence 2 of the respective work units 3 is provided for actuators A formed at the work units 3. The actuators A perform a specific form of work at the respective work units 3 on the product to be produced, for example, transport, shaping and/or gassing work.

Based on the detected actual process values I (path, pressure, vacuum, temperature, etc.) as well as the comparison of these with the target process values S from the storage unit 7, the control unit 2 according to the invention initiates a functional feedback in order to coordinate the actuators A provided at the respective work units 3 in a self-controlled manner according to the program sequence produced P by it. Thereby, the control unit 2 is configured to coordinate by itself the respective program sequences P for the respective actuators A of the work units 3 and/or to control the respective program sequences P in a self-controlling manner coordinated to one another in order to ensure a smooth and economic operating sequence of the packaging machine 1.

In particular, the control unit 2 according to an embodiment of the invention can be configured to control the program sequence P of at least one work unit 3 depending on the progress of another program sequence of at least one other work unit 3. Thereby, the control unit 2 could ensure that the program sequence P of at least one work unit 3 is started when at least at one other work unit 3 a predetermined actual process value I is detected. The respective program sequences P, thus, can be easily coordinated to one another, wherein their functionality depends on the respectively detected actual process values at the work units 3 as well as of the functional feedback thereon. The packaging machine 1 according to the invention, thus, is designed to coordinate the respective program sequences carried out thereon in a self-controlling manner, wherein this in particular is effected in real-time without requiring specific values or sequences to be adjusted by a machine operator on the packaging machine.

Furthermore, FIG. 1 shows that the storage unit 7 contains a database system 9 which is preferably equipped with a database 10 as well as with a database management unit 11. In the database 10, specific data sets may be stored for the respective products to be produced, which are in particular the respective target process values. It could also be that in the database 10 specific product properties are stored based on which the database management unit 11 derives the target process values S.

FIG. 1 also shows that the control unit 2 can be functionally connected to an external network 13 via a wireless data connection 12. The external network 13 may be a computer network from which the control unit 2 can be controlled. Furthermore, the control unit 2 can be configured to be controlled by the external network 13 as well as on the basis thereof, to control the storage unit 7, for example, in order to update and/or supplement the data sets stored in the database 10. Optionally, the control of the storage unit 7, in particular of the database 10 contained therein, would be possible via the control unit 2 also by means of an operating console 14 provided directly on the packaging machine 15.

Figure 2:
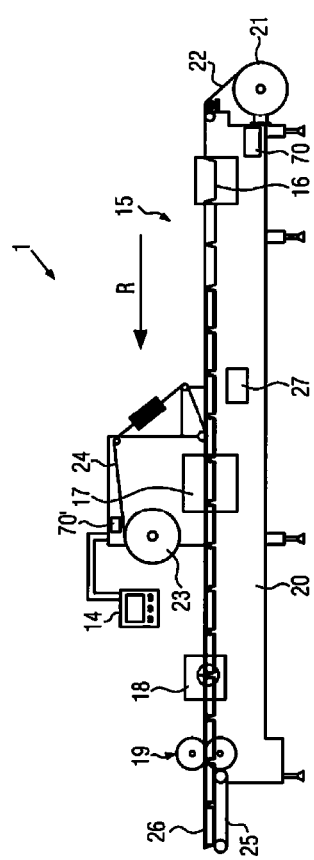
FIG. 2 is a schematic side view of one embodiment of a deep-drawing packaging machine in accordance with the teachings of the present disclosure.

In FIG. 2, the packaging machine 1 according to the invention is designed as a deep-drawing packaging machine 15. The deep-drawing packaging machine 15 comprises a molding station 16, a sealing station 17, a cross-cutting station 18 as well as a longitudinal cutting station 19 which are arranged in this order in a working direction R on a machine frame 20. A feed roller 21 is located on the input side on the machine frame 20 from which a film web 22 is drawn. In the region of the sealing station 17, a material reservoir 23 is provided from which a cover film 24 is drawn. On the outlet side, an outfeed unit 25 in form of a conveyor belt is provided on the deep-drawing packaging machine 15 by means of which finished separated packages 26 are removed. Furthermore, the deep-drawing packaging machine 1 comprises a schematically shown film feeding device 27 which grips the film web 22 and transports it further in the working direction R per main working cycle. The film feeding device 27, for example, is designed as transport chain arranged on one side or on both sides on the film web 22. Furthermore, FIG. 2 shows an RFID reader 70, 70' which is configured to detect information of an RFID tag (not shown) which is mounted on the lower film 22 or the cover film 24. The information read out is in particular film specifications.

The inventive principle which had been described above in connection with the generally illustrated packaging machine 1 from FIG. 1 can be applied to the deep-drawing machine 15 according to FIG. 2. Without being limited thereto, in the deep-drawing machine 15 from FIG. 2, in particular the molding station 16 as well as the sealing station 17 are possible as functionally controlled work units 3 as explained in connection with the packaging machine 1 from FIG. 1.

The molding station 16 is particularly suitable for a process control according to the invention. In the following, this is explained in more detail with reference to different embodiments according to FIGS. 4a, 4b, 5a, and 5b. Furthermore, in the following, it is explained in connection with FIG. 6 how the principle according to the invention can be applied at the sealing station 17. The sealing station 17, considered individually, could comprise a plurality of work units 3, for example a sealing tool, a gassing tool, an evacuation tool and/or a transport means provided separately for this purpose which each run according to self-controlling program sequences by themselves and/or in adaptation to one another. An exemplary sealing station is described below in connection with FIGS. 6a and 6b.

According to the present invention, therefore, the processes carried out in the deep-drawing machine 15 are no longer primarily time-controlled at the respective work units 3 but rather run in a self-controlling, process-oriented manner as a function of actual process values I measured and reached there.

Figure 3:
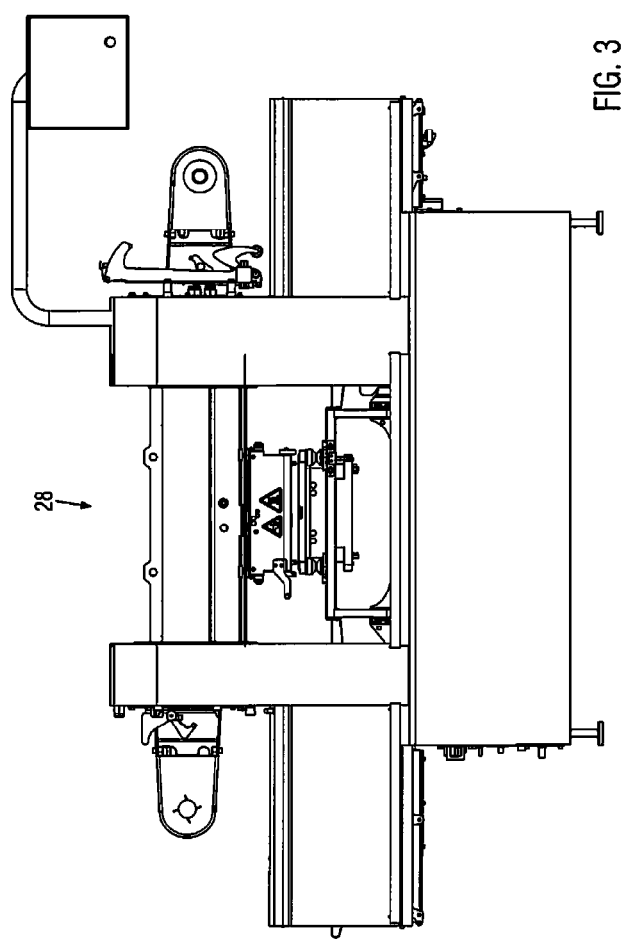
FIG. 3 is a front view of one embodiment of a tray sealer in accordance with the teachings of the present disclosure.
Figure 7A:
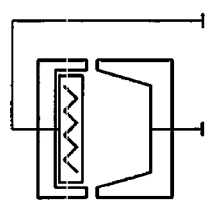
FIG. 7a is a schematic section view of a prior art molding station.

According to FIG. 3, the packaging machine 1 according to the invention is designed as a tray sealer 28. The inventive principle as above described in connection with FIG. 1 of the self-controlling packaging machine 1 may also be applied to the tray sealer 28.

Figure 4A:
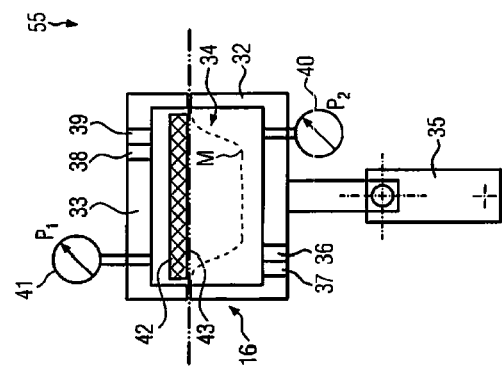
FIG. 4a is a section view of one embodiment of a molding station in accordance with the teachings of the present disclosure.
Figure 4B:
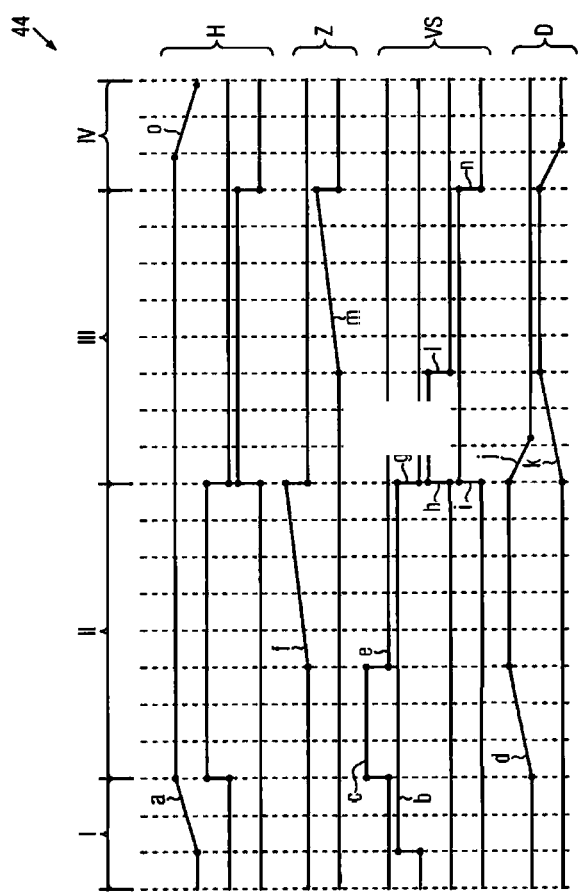

FIG. 4a shows the molding station according to an embodiment variant. The process of the molding station 16 shown in FIG. 4a is shown in FIG. 4b.

The molding station 16 from FIG. 4a comprises a lower part 32 and an upper part 33. Between the lower part 32 and the upper part 33, a molding chamber 34 for forming packaging troughs M is formed. The lower part 32 is connected to a lifting unit 35 which height-adjustably supports the lower part 32 relative to the upper part 33. In the lower part 32, a lower pressure valve 36 and a lower ventilating/aerating valve 39 are provided. In the upper part 33, an upper pressure valve 38 and an upper ventilating/aerating valve 39 are provided.

FIG. 4a also shows that in the lower part 32, a lower pressure measurement device 40 and in the upper part 33, an upper pressure measurement device 41 are provided. The lower and the upper pressure measurement devices 40, 41 are functionally connected to the control unit 2 of the packaging machine 1.

In addition, according to FIG. 4a, a heating plate 42 is arranged within the molding chamber 34. Below the heating plate 42, a film section 43 is positioned which is clamped between the lower part 32 and the upper part 33. In the molding chamber 34, initially, the film section 43 is heated by means of the heating plate 42 and subsequently molded into a desired form by means of suitable pressure generation and/or vacuum generation within the molding chamber 34 in order to produce the packaging troughs M. This is explained in more detail with reference to FIG. 4b.

FIG. 4b shows a process diagram 44 for the process-controlled process according to the invention of the molding station 16 shown in FIG. 4a. The process diagram 44 shows in a vertical arrangement main processes H, process times Z, a valve control sequence VS, and pressure distributions D which run at the molding station 16 in a process-controlled manner to one another in order to produce packaging troughs M. In a horizontal arrangement, the process diagram 44 is time-divided into process block I to IV.

In process block I, the molding station 16 sandwiches the film section 43 between the lower part 32 and the upper part 33. For this purpose, the lifting unit 35 moves the lower part 32 relative to the upper part 32 from an open position into a closed position (step a). The lower aeration valve 37 is brought into a closed position (step b).

In process block II, the molding station 16 is closed. Process block II comprises heating of the clamped film section 43 in order to subsequently deform the same more easily. In the lower part 32, a pressure is initially generated due to which the film section 43 is pressed against the heating plate 42 (step c). The pressure rise thereby is monitored by means of the lower pressure measurement device 40 (step d).

Furthermore, in process block III, the pressure supply is interrupted in the lower part 32 (step e) and heating of the heating plate 42 is started according to a heating time (step f), when the pressure in the lower part 32 has reached a target value (target process value). The film section 43 now abuts free from creases on the lower side of the heating plate 42 and can be heated rapidly. The pressure level thereby is maintained in the lower part 32 during the heating time.

At the end of the process block II or at the beginning of the process block III, i.e. after expiration of the heating time, the lower aeration valve 37 opens (step g). In addition, the upper pressure valve 28 opens (step h) and closes the upper aeration valve 39 (step i). In process block II, now the heated film section 43 is molded. Thereby, the film section 43 is pressed into the lower part 32 and formed to a packaging trough M.

In process block III, the pressure rise generated in the upper part 33 is monitored (step k). While the pressure in the lower part 32 is decreasing (step j), the pressure in the upper part 33 increases up to a threshold value (target process value) (step k). Upon reaching the threshold pressure in the upper part 33, the pressure generation in the upper part 33 is interrupted (step 1) and a stabilization time (cooling time) is started (step m). During the stabilization time, the pressure level in the upper part 33 is maintained so that the produced packaging trough M retains its form. At the end of the stabilization time, the molding process is completed according to process block III. The packaging trough now is cured.

At the beginning of process block IV, the upper aeration valve 39 opens (step n). Thereby, the pressure level decreases in the upper part 33. From a predetermined pressure threshold value (target process value) in the upper part 33, the lifting unit 35 opens the molding station 16 (step o). The molded packaging trough M can now be conveyed out of the molding chamber 34, wherein simultaneously, a new film section 43 to be molded moves up into the molding station 16.

Depending on the used film type and/or tool type, the threshold pressure values mentioned in the process blocks II and III may vary in the above described example. The control unit 2 is preferably configured to automatically generate the respective threshold pressure values as target process values from the storage unit 7, in particular by means of the database 10. Further, the control unit can vary the heating and stabilization time (steps f and m), at least with regard to the film material and/or the tool type.

Figure 5A:
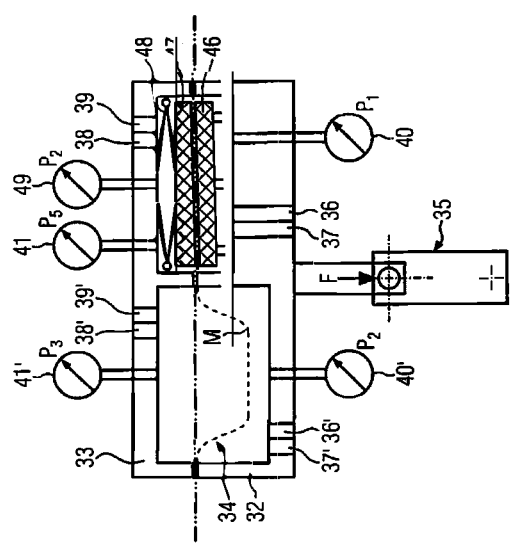
FIG. 5a is a section view of another embodiment of a molding station in accordance with the teachings of the present disclosure.
Figure 5B:
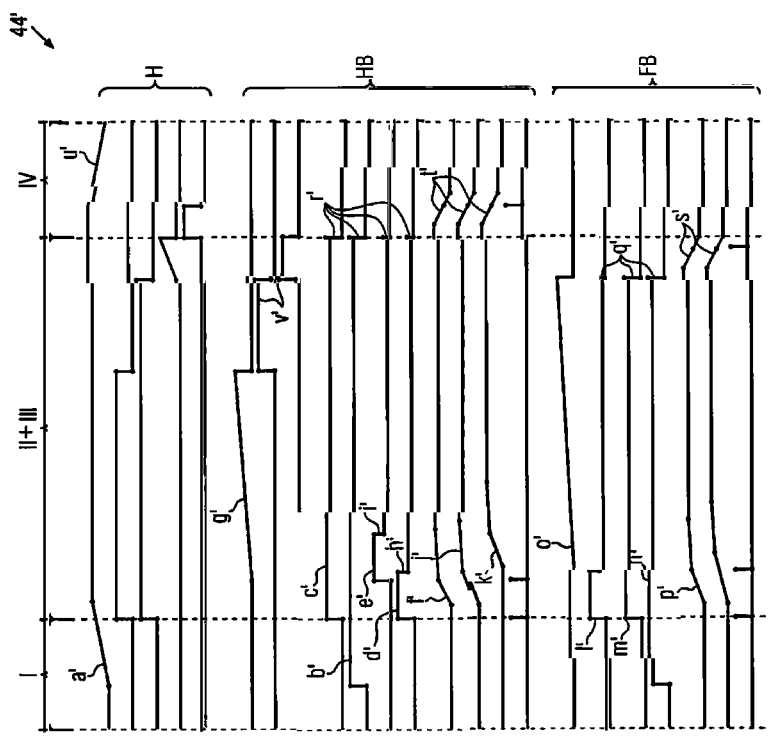

FIG. 5a shows the molding station 16 according to another embodiment variant. The process of the molding station 16 shown in FIG. 5a is illustrated in FIG. 5b.

The molding station 16 from FIG. 5a comprises a separate heating chamber 45 which is operated as preheating. The heating chamber 45 as seen in the process direction is arranged in front of the molding chamber 34. A lower and an upper heating plate 46, 47 are provided within the heating chamber 45. Between these, the film section 43 to be heated is guided through. Above the upper heating plate 47, a pressure generator 48, in particular an inflatable membrane, is arranged which in its inflated state presses the upper heating plate 47 against the lower heating plate 46.

Further, the heating chamber 45 and the molding chamber 34 are each provided with pressure and aeration valves 36, 36', 37, 37', 38, 38', 39, 39'. The applied pressures are detected in the heating chamber 45 and in the molding chamber 34 by means of lower and upper pressure measurement devices 40, 40', 41, 41', respectively. A pressure applied in the pressure generator 48 is detected by means of a pressure generating measurement device 49.

FIG. 5a shows that the heating chamber 45 as well as the molding chamber 34 can be simultaneously opened or closed if the lower part 32 is adjusted by means of the lifting unit 35. It would also be conceivable to design the lower part 32 in a two-part manner, wherein the respective parts of the lower part 32 are adjustable separately from one another by means of specially designed lifting units 35.

FIG. 5b shows a process diagram for the molding station 16 shown in FIG. 5a. In the double chamber design of the molding station 16, heating as well as molding run temporally parallel to one another. The processes from the process blocks II and III, thus, do not run temporally one after the other. For a better understanding, however, in the following heating and molding are separately described.

The process diagram 44' shows working processes in a heating function block HB which run in the heating chamber 45 and working processes in a molding function block FB which run in the molding chamber 34.

Initially, in the process block I, the molding chamber 16 is closed (step a'). The lifting unit 35 thereby lifts the lower part 32, due to which the heating chamber 45 and the molding chamber 34 close. The heating function block HB shows that the lower aeration valve 37 is closed (step b'). Moreover, the heating function block HG shows that by the lower pressure valve 36, a vacuum is generated in the heating chamber 45 in the lower part 32 in order to draw the film section 43 onto the lower heating plate 45 (step c'). Likewise, a pressure is applied in the upper part 33 of the heating chamber 45 which, however, is optional. For this purpose, the upper pressure valve 38 opens (step d'). Additionally, the pressure generator 48 presses the upper heating plate 47 due to which the film section 43 is fixedly clamped between the lower and the upper heating plate 46, 47 (step e'). In particular, thereby proportional control valves can be used for the precise pressure generation in the upper part 33 and the heating chamber 45.

The heating block HB also shows that a pressure reaction within the heating chamber 45 is set temporally delayed (dead time) relative to the switching processes at the pressure valves (step c' and d'). This is taken into account in the control process of the molding station 16. Based on such a dead time control, the valve switching processes (step c' and d') may be controlled prematurely, for example 100 ms, already if the molding station is not yet in the closed position (see step a'). This, for example, occurs by means of a path measurement device for the lifting unit 35, wherein the path measurement device issues a signal to the control unit from a certain closing distance of the lifting unit 35 so that said control unit controls the respective valves at an early stage.

In the heating function block HB, the respective pressures in the heating chamber 45 are monitored at the beginning. As soon as a predetermined pressure level is detected in the lower part 32 by the measurement device 40 (step f), the control unit 2 starts a heating process at the lower heating plate 46 (step g'). The pressures in the upper part 33 may be arbitrarily controlled during the heating process. In particular, the pressures in the upper part 33 are decreased upon reaching a predetermined pressure within the upper part 33 and/or within the pressure generator 48 (steps h' and i').

Furthermore, it is shown that the vacuum in the lower part 32 and the pressure in the upper part 33 rise almost simultaneously (step f and j'). The additionally applied pressure by means of the pressure generator 48 rises in a delayed manner (step k') only after the pressure level in the upper part 33 and/or the vacuum level in the lower part 32 each have assumed a predetermined value.

In the molding function block FB, the lower and/or upper pressure valves 36', 38' are prematurely controlled such as the lower and/or upper pressure valve 36, 38 of the heating chamber 45 at an early stage according to the dead time control, for example 100 ms before the molding station 16 is closed (step l' and m'). The pressure rise in the upper part 33 and/or the vacuum generation in the lower part 32 are monitored by the pressure measurement devices 40', 41'. The lower aeration valve 37' remains closed during the molding process (step n').

From a predetermined pressure in the upper part 33 and/or vacuum in the lower part, the stabilization time starts to run (step o'). This may in particular be started also during the pressure and/or vacuum generation (step p'). During the stabilization time, the molded packaging trough M cools down due to which it becomes dimensionally stable.

FIG. 5b shows that the heating chamber 45 is shorter than the stabilization time in the molding chamber 34. However, the molding chamber 34 is earlier ventilated than the heating chamber 45 (steps q' and r'). While the molding chamber 34 immediately after expiration of the stabilization time starts ventilation (step q'), the respective valves 36, 37, 38, 39 of the heating chamber are ventilated only when the pressure and/or the vacuum in the molding chamber is generated (step s'). With a certain time delay, then also the pressures in the heating chamber 45 are reduced (step t').

As soon as the pressure level in the molding chamber 34 and in the heating chamber 45 have jointly reached and/or fallen below a predetermined value, the lifting unit 35 moves downwards and opens the molding station 16 (step u'). According to FIG. 5b, the molding station 34 could already have been opened at an early point in time (step s').

Therefore, it would also be conceivable to use separately operating lifting units 35 at the heating chamber 45 and the molding chamber 34. Thereby, dead times could be reduced (step v'). Alternatively, the control unit 2 could temporally coordinate the ventilation of the respective valves at the heating chamber 45 and the molding chamber 34 such that a predetermined pressure level for opening the molding station 16 at best is set simultaneously within the heating chamber 45 and the molding chamber 34. In case of FIG. 5b, the ventilation of the heating chamber 45 (step r'), for example, could be initiated earlier in order to bring the pressure reduction (steps t' and s') temporally closer together.

Figure 6A:
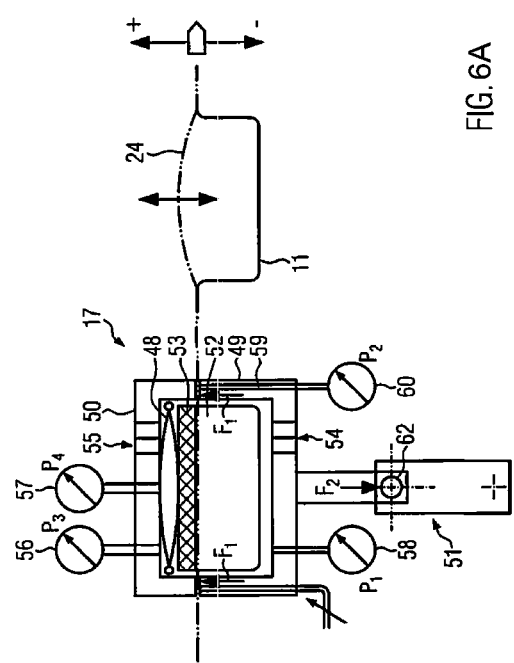
FIG. 6a is a section view of one embodiment of a sealing station in accordance with the teachings of the present disclosure.

FIG. 6a shows a sealing station 17 from FIG. 2 in an enlarged view. The process-controlled functional principle according to the invention can also be applied to this sealing station 17.

In a further variant which is not shown in more detail, a form punch is provided for the molding chamber 34. According to the prior art, the punch movement was started downwards and the molding process was started in a time-controlled manner with some delay. In the variant according to the invention, the punch movement is started and also the molding process is started as soon as the form punch has reached a predetermined position.

In FIG. 6a, the sealing station 17 comprises a sealing lower part 64 and a sealing upper part 50. The sealing lower part 64 is height-adjustable by means of a lifting unit 51. Between the sealing lower part 64 and the sealing upper part 50, a sealing chamber 52 is formed. In the sealing chamber, the cover film 24 is sealed onto the packaging trough M in order to seal a (food) product therein. A sealing plate 53 is positioned above the cover film 24. Furthermore, a pressure generator 48, for example an inflatable membrane, is provided within the sealing upper part 50 which can be used to press down the sealing plate 53 in order to seal the cover film 24 on the packaging trough M.

The sealing lower part 64 comprises a valve unit 54 for generating a vacuum and for ventilating the sealing lower part 64. The sealing upper part 50 comprises an upper valve unit 55 for generating a vacuum and for ventilating the sealing upper part 50.

The sealing upper part 50 is equipped with an upper pressure measurement device 56. The pressure in the upper pressure generator 48 is measured by means of a pressure generator measurement device 57. The sealing lower part 64 is equipped with a lower pressure measurement device 58. In addition, a vacuum generator 59 is formed within the sealing lower part 64 which can generate a vacuum in the packaging trough M. The generated depression in the packaging trough M is measured by a vacuum measurement device 60. A gassing unit 61 can be provided in the sealing lower part 64 for gassing the packaging trough M with an arbitrary atmosphere gas.

Figure 6B:
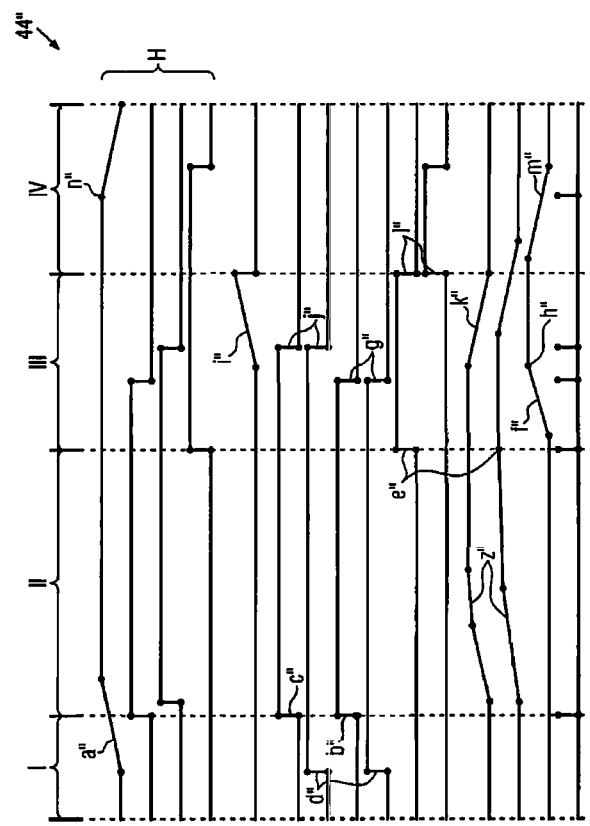
Figure 7B:
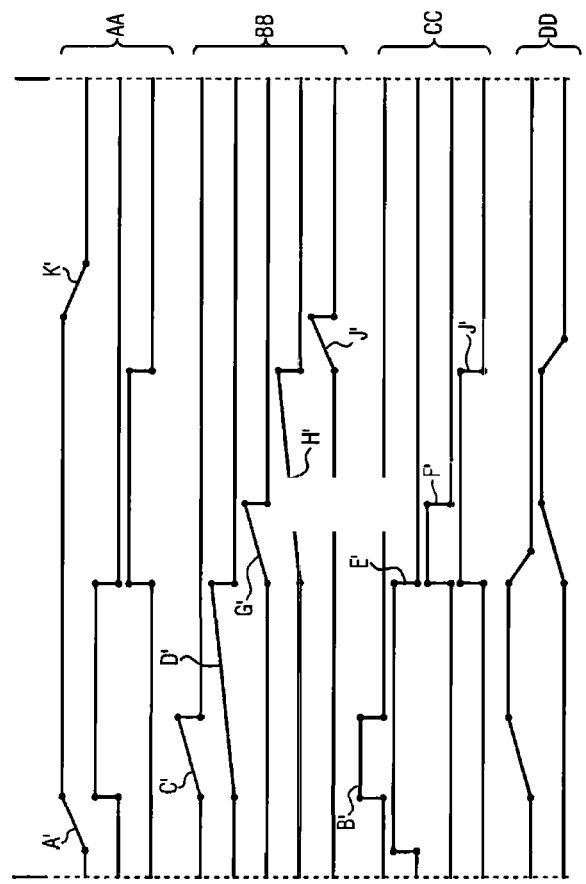
FIG. 7b is a schematic time-controlled process diagram for the prior art molding station from FIG. 7.

FIG. 6b shows the functional connections at the sealing station 17 from FIG. 6a. The sealing process 44" thereby runs in a process-controlled manner.

Initially, in the process block I of FIG. 6b, the sealing lower part 64 by means of the lifting unit 51 is moved from an open position into a closed position in which the sealing lower part 64 with the sealing upper part 50 seals the packaging trough M and the cover film 24 positioned above it with the sealing chamber 52 (step a").

Before the sealing lower part 64 arrives in the closed position, the lower valve unit 51 is controlled for evacuating the sealing lower part 64 (step b"). The upper valve unit 55 is controlled with a slight delay, however still before reaching a closed position of the sealing lower part 64 for evacuating the sealing upper part 50 (step c"). The temporal forerun for controlling the valve units 54, 55 serves to eliminate dead times which add up as of controlling to the valve reaction and further up to the actual pressure or vacuum generation. These dead times may be determined by the control unit 2 in a test run.

In process block I, for generating a vacuum in the sealing lower part 64 as well as in the sealing upper part 50, the valve units 54, 55 remain closed for a ventilation (step d"). With a certain time delay, a vacuum is built up at the beginning of the process block II in the sealing lower part 64 as well as in the sealing upper part 50. By the generated vacuum in the sealing lower part 64, initially, the packaging trough M is fixed. The vacuum in the sealing upper part 50 ensures that the cover film 24 is aligned free of creases over the packaging trough M.

Moreover, the vacuum pressure distributions are monitored within the sealing lower part 64 and the sealing upper part 50 (step z"). In the process block II, a vacuum is generated in the sealing lower part 64 and/or in the sealing upper part 50 until a predetermined vacuum value is detected in the sealing lower part 64 and/or in the sealing upper part 50 (step e").

According to the invention, a moisture sensor (FS) is provided which is not shown in more detail (see FIGS. 9a and 9b) in order to detect the degree of moisture in the vacuum for the product. It may occur that a predetermined end vacuum cannot be reached, since the product generates too much moisture. In this case, the control detects this and terminates this process step, although the end vacuum, namely the predetermined vacuum value had not yet been reached.

According to FIG. 6b, in the process block II, a predetermined vacuum pressure in the sealing upper part 50 is reached at the end which initiates an inflation of the pressure generator 48, whereby the sealing plate 53 is pressed downwards and the cover film 24 presses onto the edge of the packaging trough M. Thereby, a contact pressure is generated in the sealing region (step f"). This mechanical contact pressure can be measured by means of at least one force sensor 62 (see FIG. 6a) which is provided in the sealing lower part 64 and/or in the associated lifting unit 51. Alternatively, the pressure of a membrane which generates the sealing force can also be determined by means of a pressure sensor.

Shortly afterwards, when the contact pressure is equal to a maximum sealing pressure (step h"), a sealing time is started (step i") during which the cover film 24 is welded to the packaging trough M. The sealing time can be determined depending on the used packaging materials and/or the used sealing tool type.

During the sealing time, with a time delay for ventilating the sealing lower part 64, also the sealing upper part is ventilated (step j"). In particular, the decrease of the vacuum in the sealing lower part 64 to a certain vacuum value can serve as a triggering event (step k").

The sealing plate 53 remains depressed until the sealing time in the process block III expires. As soon as the sealing time has expired, the sealing plate 53 is lifted (step l"). For this, the pressure is released from the pressure generator 48 and monitored (step m"), whereby the sealing plate 53 may be moved back into an initial position. As soon as the pressure in the pressure generator 48 reaches a predetermined value, the sealing station 17 can be opened in the process block IV (step n"). Opening the sealing station 17 may already be initiated when the sealing plate 53 has not yet completely reached its initial position, i.e. the pressure in the pressure generator 48 has not yet completely released. The vacuum in the sealing lower part 64 and in the sealing upper part 50 at this point in time is already completely released by ventilation.

The above described embodiments turn away from a time-based control of the production process of a packaging machine. Time-controlled program sequences are preferably no longer taken into account. Rather, by means of the control unit 2, the packaging machine according to the invention intervenes in the production process in a self-controlling manner based on actually detected process parameters in order to coordinate the respective program sequences P carried out at the work units 3 themselves and/or in coordination to one another. This leads to an economic production process, wherein the packaging machine 1 according to the invention is suitable for producing a plurality of different products, in particular due to a high availability.

As a further embodiment, it is conceivable that information and/or specifications of consumables, such as the film 22 and the cover film 24, are automatically detected, for example, by means of RFID and are processed by the control unit. Thereby, RFID readers 70, 70' can read an RFID tag attached to the film roll.

Forming or sealing tools may be automatically detected, identified and/or the information contained therein may be read out and transmitted to the control unit, preferably wired or wireless by means of RFID.

Figure 8:
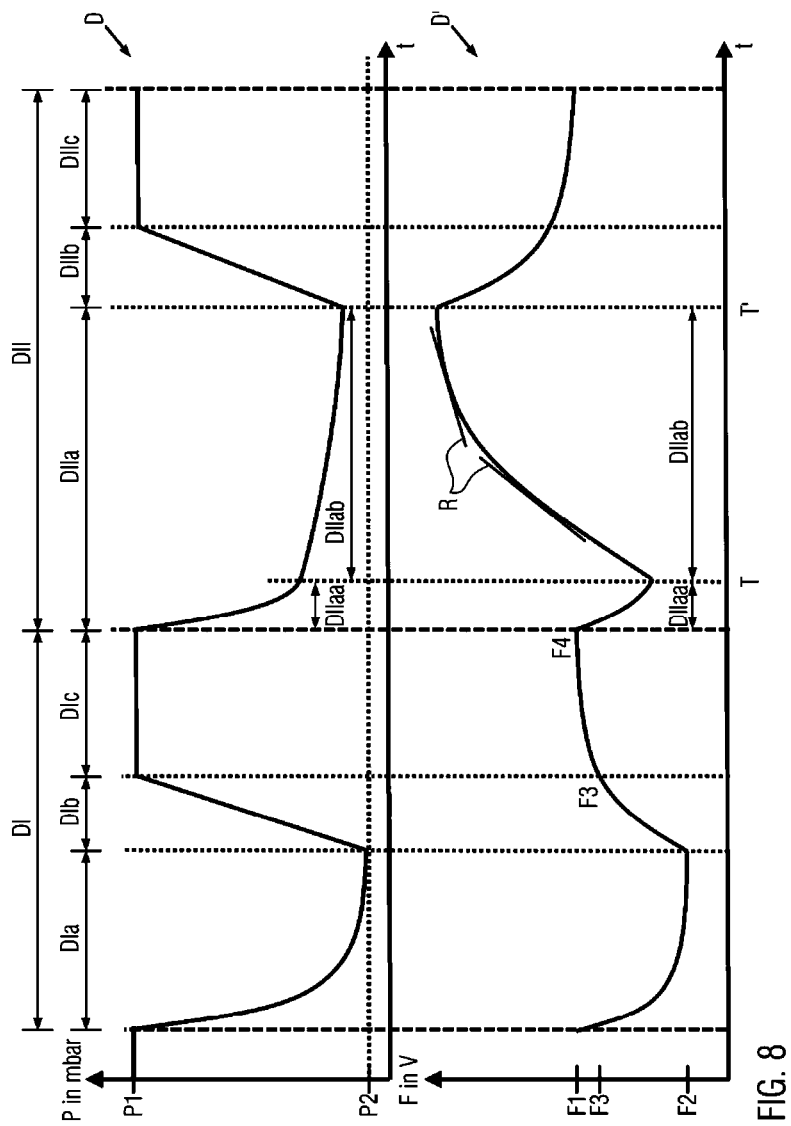
FIG. 8 is a graphical view of one pressure distribution and an associated moisture content of a dry and a moist product within the sealing station of one embodiment of the present packaging machine.

In a first diagram D, FIG. 8 shows a pressure distribution of a working cycle DI of a dry product as well as a subsequent pressure distribution of a further working cycle DII or a moist product. The pressure distribution is detected at the sealing station 17.

In a second diagram D', FIG. 8 shows a moisture content of the two products detected according to the pressure distribution in the sealing station 17 during the working cycle.

As shown in FIG. 8, in the first and second diagram D, D', the pressure distribution as well as the associated moisture content of an evacuation process DIa are shown. In diagram D, the pressure decreases during the evacuation of the dry product from a starting pressure P1 to a target vacuum pressure P2. The moisture decreases corresponding to the pressure distribution from an initial moisture F1 to a vacuum moisture F2.

Subsequently, according to FIG. 8, a gassing process DIb takes place. Thereby, the pressure rises during gassing of the dry product from the target vacuum pressure P2 to a desired gassing pressure P3 which preferably corresponds to the starting pressure P1. In diagram D', the moisture content rises from the vacuum moisture F2 to a gassing moisture F3.

According to FIG. 8, subsequent to the gassing process DIb, a sealing process DIc takes place. Meanwhile, the pressure generated by the gassing process DIb is held in the packaging of the product to be produced. Due to the heat supplied to the product for sealing, the moisture within the packaging slightly increases. At the end of the sealing process, a residual moisture F4 which preferably corresponds to the initial moisture F 1 remains within the packaging. Thus, the working cycle D1 at the sealing station 17 is completed and a new product may evacuated, treated with gas, and sealed at the sealing station 17. This process is shown by working cycle DII.

In contrast to the preceding working cycle D1 in which a dry product had been treated as requested, in working cycle DII, the sealing station 17 is supplied with a moist product.

During an initial phase DIIaa of the evacuation process DIIa, the respective pressure values as well as the associated moisture values proceed similar to the pressure values as well as the associated moisture values at the beginning from the evacuation process DIa. In this case as well, initially, the moisture is drawn from the packaging interior, whereby the detected moisture initially decreases. During the starting phase DIIa, thus, the rate of change of the moisture is negative. While during the evacuation process DIa of the dry product, the rate of change of moisture remains negative until the target vacuum pressure P2 is reached and/or is less than or equal to zero, the sign of the rate of change of moisture changes during the evacuation process DIIa at the time T, wherein the rate of change of the moisture becomes positive from the point in time T. This change of sign indicates the initiation of an evaporation phase DIIab. During the evaporation phase DIIab, the rate of change remains positive which is an indication for the fact that the product to be packaged evaporates, i.e. releases moisture.

FIG. 8 also shows a regression line R. The regression line R in FIG. 8 is determined on the basis of measured values of the moisture during the evacuation process DIIa, in particular on the basis of moisture measured values within the evaporation phase DIIab by means of the control unit 2. The rate of change of moisture can be defined by the inclination of the regression line R which changes in the course of the evaporation phase DIIab. Furthermore, FIG. 8 shows that during the evacuation process DIIa, the pressure distribution actually decreases, however, does not reach the target vacuum pressure P2. This is due to the moisture-releasing product during the evaporation phase DIIab.

The control unit 2 of the packaging machine 1 is informed of the respective measured values previously described of the pressure and the moisture and is capable to abort the evacuation process before the target vacuum pressure P2 is reached, if the above described evaporation phase DIIab occurs. The abort may for example occur immediately from a predetermined threshold for the positive rate of change of moisture. In FIG. 8, the abort occurs at the time T'. At the time T', the target vacuum pressure P2 has not yet been reached. Even if the evacuation process DIIa is continued, it is unlikely to reach the target vacuum pressure P2. It is also conceivable that the evacuation process is completed only after expiration of an additional delay time after the abort condition (threshold) has been reached. In the step following the aborted evacuation process DIIb, the product is ventilated with a desirable atmosphere. The pressure level thereby rises to a desired gassing pressure which corresponds to the starting pressure P1 according to FIG. 8.

At the end of the working cycle DII, a sealing process DIIc takes place. Meanwhile, the moisture decreases to approximately the starting moisture F1.

The procedure described above in connection with FIG. 8 which leads to the abort of the evacuation process, is outstandingly suited for application to a process-controlled packaging machine.

FIG. 9*a* shows the sealing lower part 64 as already used in FIG. 6*a* at the sealing station 17 (in the following also referred to as: sealing tool lower part 64) in a schematic view. The sealing tool lower part 64 comprises an evacuating line EL by which a desired vacuum within the sealing station 17 can be generated.

According to FIG. 9*a*, a moisture sensor FS is arranged in a section of the evacuation line EL into which multiple sections of the evacuation line EL flow. At this position, in a region after merging the individual sections of the evacuation line EL running above, the moisture sensor FS is positioned close to the sealing chamber and supplies precise measured values for the moisture.

Alternatively, according to FIG. 9b, the moisture sensor FS is arranged in an evacuation line EL' guided to the sealing tool lower part 64 between a valve V and a vacuum pump VP. Here, the moisture sensor FS is located in a distance from the sealing tool lower part 64 such that it is less prone to contamination.

The invention is outstandingly suited for the use on a process-controlled packaging machine as well as for a process-controlled packaging process.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention.

As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

The invention claimed is:

1. A packaging machine comprising:
a control unit;
at least one measurement device; and
a plurality of work units for different processes;
wherein the control unit is functionally connected to the plurality of work units and to the at least one measurement device,
wherein the measurement device is configured to detect actual process values at one of the work units and forward same to the control unit in order to monitor a process status at said one of the work units;
wherein the control unit is designed to produce a program sequence in a self-controlled manner for each of the plurality of work units and/or in a coordinated manner with respect to the plurality of work units by comparing the actual process values forwarded to the control unit from each measurement device with corresponding target process values from a storage unit connected to the control unit, and each work unit of the plurality of work units functions on the basis of the actual process values detected at the work unit and/or in a coordinated manner according to the program sequence;
wherein one of the plurality of work units is a sealing station and the at least one measurement device is at least one moisture sensor functionally connected to the control unit, wherein the at least one moisture sensor is disposed to detect moisture within the sealing station as a time-dependent measured variable during a program sequence of the sealing station, wherein the program sequence comprises an evacuation process, wherein the control unit is designed to calculate a rate of change in the moisture during the evacuation process of the sealing station, and wherein the control unit is aborts the evacuation process performed of the sealing station, based on the rate of change in the moisture before reaching a target vacuum pressure within the sealing station if the rate of change in the moisture is equal to or greater than a predetermined threshold value or if the difference of the rate of change in the moisture minus the threshold value has changed from a negative value to a positive value and back again from a positive value to a negative value.

2. The packaging machine according to claim 1, wherein the control unit is configured to abort the evacuation process if the rate of change in the moisture is positive and/or equal to or greater than a predetermined positive threshold value for the rate of change in the moisture.

3. The packaging machine according to claim 2, wherein the control unit is configured to store an abort of the evacuation process as an inacceptable working cycle if a non-target product vacuum is impermissible.

4. The packaging machine according to claim 2, wherein the control unit is configured to store an abort of the evacuation process as an acceptable working cycle if a non-target product vacuum is permissible.

5. The packaging machine according to claim 1, wherein the sealing station comprises a sealing tool lower part as well as an evacuation line integrally attached thereto, wherein the moisture sensor is arranged in the evacuation line.

6. The packaging machine according to claim 5, wherein the moisture sensor is arranged in the evacuation line in a section into which multiple sections of the evacuation line flow.

7. The packaging machine according to claim 1, wherein the sealing station comprises a sealing tool lower part and an evacuation line connected to the sealing tool lower part, wherein the moisture sensor is arranged in the evacuation line.

8. The packaging machine according to claim 7, wherein the evacuation line connects the sealing tool lower part to a vacuum pump and comprises a valve, wherein the moisture sensor is arranged between the vacuum pump and the valve.

9. The packaging machine according to claim 1, wherein the packaging machine comprises a second storage unit, wherein the control unit is configured to store intermittently, time-dependent measured values detected at the sealing station on the second storage unit.

10. The packaging machine according to claim 1, wherein the control unit is configured to calculate a regression line which determines the rate of change in the moisture on the basis of multiple absolute measured values of moisture.

11. The packaging machine according to claim 1, wherein the control unit is configured to consider a measurement period of 4 to 500 milliseconds as filter function and condition for the abort of the evacuation process within which the rate of change in the moisture is exclusively positive.

12. The packaging machine according to claim 1, wherein the control unit is configured to issue an error message, if no positive rate of change in the moisture can be detected by the control unit during the evacuation process and the target vacuum pressure cannot be reached within the sealing station.

13. The packaging machine according to claim 1, wherein the packaging machine is a deep-drawing packaging machine, a tray sealer, or a chamber conveyor machine.

14. The packaging machine according to claim 1, wherein the sealing station comprises a movable lower part and an upper part sandwiching a sealing chamber and the work unit comprises at least one pressure measurement device.

15. The packaging machine according to claim 1, wherein the program sequence comprises a gassing process, wherein the control unit is configured to start the gassing process when the evacuation process is completed.

16. A method for self-controlling a program sequence of a process at a plurality of work units of a packaging machine, the method comprising the steps of:
   functionally coordinating one or more of a plurality of processes according to the program sequence during the operation of the packaging machine at each of the plurality of work units;
   detecting one or more actual process values at one or more of the plurality of work units with a measuring device;
   forwarding the detected one or more actual process values to a control unit of the packaging machine;
   comparing the forwarded one or more actual process values with associated target process values using the control unit;
   generating the respective program sequence for the plurality of work units; and
   coordinating the operation of the packaging machine based upon the generated respective program sequence;
   wherein one of the plurality of work units of the packaging machine is a sealing station, the measuring device comprises at least one moisture sensor to detect a moisture within the sealing station as a time-dependent measured value, and
   wherein the method further comprises the steps of calculating a rate of change in moisture at the sealing station during the program sequence sing the control unit, and aborting an evacuation process carried out at the sealing station before achieving a target vacuum pressure within the sealing station using the control unit if the rate of change in moisture is equal to or greater than a predetermined threshold value, or if a difference of the rate of change minus the threshold value changes from a negative value to a positive value and back again from a positive value to a negative value.

17. The method according to claim 16, further comprising the step of aborting the evacuation process using the control unit if the rate of change of moisture is positive and/or equal to or greater than a predetermined positive threshold value for the rate of change.

18. The method according to claim 16, further comprising the step of calculating a regression line using the control unit, wherein the regression line determines the rate of change of moisture on the basis of multiple absolute measured values of moisture.

19. The method according to claim 16, wherein the control unit considers a measurement period of 4 to 500 milliseconds as a filter function and condition for the abort of the evacuation process within which the rate of change of in the moisture is exclusively positive.

20. The method according to claim 16, further comprising issuing an error message using the control unit if no positive rate of change of the moisture can be detected by the control unit during the evacuation process and the target vacuum pressure is not reached within the sealing station.

21. The method according to claim 16, further comprising the step of starting a gassing process at the sealing station using the control unit when the evacuation process is completed.

* * * * *